United States Patent [19]

Gurgui et al.

[11] 4,127,433

[45] * Nov. 28, 1978

[54] INSTALLATION FOR PRODUCING A MATERIAL FOR THE FINISHING AND DECORATING OF THE BUILDINGS

[75] Inventors: Constantin N. Gurgui; Vasile Luca; Andrei Eckardt; Paraschiv I. Ciulacu, all of Bucharest, Romania

[73] Assignee: Intreprinderea "Bucuresti" Pentru Extragerea Prelucrarea si Montarea Marmurei si Pietrei de Constructii, Bucharest, Romania

[ * ] Notice: The portion of the term of this patent subsequent to May 10, 1994, has been disclaimed.

[21] Appl. No.: 792,907

[22] Filed: May 2, 1977

Related U.S. Application Data

[60] Continuation-in-part of Ser. No. 607,608, Aug. 25, 1975, Pat. No. 4,022,650, which is a division of Ser. No. 221,467, Jan. 27, 1972, Pat. No. 3,930,088, which is a division of Ser. No. 791,405, Jan. 15, 1969, Pat. No. 3,705,830.

[30] Foreign Application Priority Data

Jan. 20, 1968 [RO] Romania ................................. 55659

[51] Int. Cl.$^2$ ....................... B32B 31/12; B32B 31/14; B32B 35/00

[52] U.S. Cl. .................................... 156/498; 156/499

[58] Field of Search .................. 156/71, 72, 242, 243, 156/279, 298, 382, 390, 498, 499, 538

[56] References Cited

U.S. PATENT DOCUMENTS 4,022,650 5/1977 Gurgui et al. ........................ 156/498

*Primary Examiner*—Caleb Weston

*Attorney, Agent, or Firm*—Karl F. Ross

[57] ABSTRACT

The installation produces a material, as a prefabricated flexible foil, for finishing and deçorating buildings, of the type in which a cover with several layers of granules, spread upon a supporting net, has the granules bound to each other and to the yarns of the supporting net by invisible fine pellicles of a thermoplastic synthetic resin binder. The installation comprises: means for priming the supporting net of natural textile fibers; a conveyor belt, for supporting and displacing the supporting net on which suitable means spread all at once the granule layer and press it slightly, then another following means sprays it, from above, with the binder dissolved in a solvent or dispersed in water; a heating tunnel which receives, on a conveyor belt of wire net the supporting net with the granule layer and the sprayed and retained liquid; infrared heaters located below the wire belt in the tunnel which evaporate the liquid, while the released binder forms into fine pellicles; a smooth roller which detaches from the conveyor belt the resulting material foil, which, when leaving the tunnel, passes between two smooth rolls, for slight compaction of the foil and cooling means which cool down the foil.

3 Claims, 6 Drawing Figures

INSTALLATION FOR PRODUCING A MATERIAL FOR THE FINISHING AND DECORATING OF THE BUILDINGS

CROSS-REFERENCE TO RELATED APPLICATION

This is a continuation-in-part of application Ser. No. 607,608, filed Aug. 25, 1975, now U.S. Pat. No. 4,022,650, an application which was a division of the application Ser. No. 221,467 filed Jan. 27, 1972 (U.S. Pat. No. 3,930,088), in turn a division of Ser. No. 791,405, filed Jan. 15, 1969, now U.S. Pat. No. 3,705,830.

FIELD OF THE INVENTION

The invention concerns a prefabricated material for the finishing and the decoration of the buildings, as well as a process and an apparatus for its manufacture.

BACKGROUND OF THE INVENTION

For the purpose of finishing and decorating building, tapestry has been suggested which, unlike the old tapesty of paper or textile material, consists of a support of paper or conventional textile material covered by a decorative layer applied in the form of a paste. The paste consists of various binders and filling material, made of natural or artificial matter, ground to a fine grain size or to dust and applied by means of simple rakes or of special brushes. Due to the dusty character of the filler, these layers have not succeeded in assuming the decorative aspect of the natural materials from which the dusty filler was derived. That is why recently prefabricated finishing materials in the shape of flexible foils and plates have been proposed, these comprising a support of textile or of glass felt, covered by a layer of plaster made of a binder of synthetic resins and small or larger granules, in narrow dimensional ranges, applied mechanically. To fix the foil, the back side of the support is covered with a layer of "fillerized" binder, which is attached to the components of the building by means of a cement mortar, with an addition of binders of polymers, emulsifiable in water. The face layer of the sheet of material is opacified, and does not show clearly the grains; the structure and the visual aspects of the natural materials employed for the paste are greatly modified. Moreover, the paste or the mortar require large quantities of binder, thereby making for high prices.

During the last two decades many other prefabricated dry materials have been suggested for the finishing and decoration of buildings. Material consisting of a sheet of elastomer, with expanding additives, covered by a wearable layer of rubber, colored or possibly offset, treated in a furnace for the purpose of expanding or of vulcanizing the wearable layer, which is a material of poor decorative effect and may be practically employed only for flooring. In a similar material, the lower layer consists of expanded plastics. Another material suggested applies on a carrying layer made of jute or sewn felt, a layer of expanded polyvinyl chloride and over it a thin wearable layer of polyvinyl chloride, colored or slightly embossed. All these materials, which may be used indoors, especially for flooring, consist essentially of plastics and have the artificial appearance of the latter.

Instead of the old and new types of mosaic for floors and walls, attached manually, at high costs, from bigger or smaller flat parts (the so-called "Kleinmosaik"), fixed by means of wet mortar, finishings and decorations made of mosaic foils, have been suggested, with small bits of artificial stones, glass, metal, ceramics, plastics, prefabricated foils, flexible and dry. They consist of a layer of flat components of the same or different kind, color, etc., fixed together by filling the space between them and by means of a connecting layer made of thermoplastic polymers, attached to a support of asbestos felt, impregnated with a thermoplastic polymer, plastified and fillerized. For fastening, thermoplastic polymers and copolymers of polyvinyl chloride are employed, as well as mixtures of the above; the impregnation is performed with acrylic polymer with additives.

A material suggested for finishing and for decoration, as an artificial stone, consists of a relatively thin support sheet of nonhardened synthetic resin, into which larger granules (bits) of crushed rock are partially thrust; the support is then hardened and fixes the granules, which are ground with flat facettes, partially or down to the support level; in one version, the spaces between the large granules are filled with smaller granules, in the form of a paste with binder of synthetic resin or an inorganic one, the whole surface being then ground, flat or corrugated, after hardening; in another version, the support is translucent, of adequate thickness and has larger granules thrust in it so that the foil may be applied with either face towards the support, the granules being visible, either directly or by transparence. The foils have the appearance of artificial material deriving from the visible support or plastic binder, and are rather expensive, due both to the basic materials which are used and the high production costs.

OBJECT OF THE INVENTION

The present invention is to provide a new material for the finishing and the decoration of buildings, which eliminates the drawbacks of known materials for this purpose, and to provide a process and an apparatus suitable for producing this material.

SUMMARY OF THE INVENTION

The material for the finishing and the decoration of buildings, according to the invention, is ready finished veneer, having the appearance of a split natural crystalline stone, or else a similar appearance, in the shape of flexible, prefabricated foils, and consists of an upper layeer, screening the bottom layer, made of a covering of hard granules, of rock or artificial stone an invisible binder of synthetic resins connecting the granules of the cover to each other, and a bottom layer in the form of a net the meshes of which are traversed by points of the hard granules, so that the foil of material may be firmly applied with the back side directly to the components of the building and is able to adhere directly and to be interpenetrated by the usual mortars, eventually with the help additives. The mortars are, of preferably, cement-mortar, cement and lime mortar, plain mortars or mortars with additives, for instance synthetic resins, which may be dispersed in water.

As hard granules, bits of rock, in natural sizes or crushed, raw or polished, are employed, being of a particle size range 0.5–5 mm, the dust being removed by washing.

Granules, generally resistant to atmospheric agents, are employed, consisting for instance of the following:

crystalline sedimentary-metamorphic rocks, such as marble or alabaster, white or else naturally or artificially colored, gneiss, various shales, quartzites and the like;

eruptive and volcanic rocks, such as granites, porphyry, sienites, feldspars, quartz, jasper, silex, tuffs, trachytes and the like.

Granules of any convenient artificial materials may be employed, such as silicon carbide, glass granules, transparent or opaque, colorless or colored, as inorganic materials; equally, granules of hard plastics, such as polystyrene, polyvinyl chloride, acrylates, etc., preferably colored and opacified may be used.

As mentioned, the face layer, consisting of the granule cover, masks completely all that is behind it, that is the supporting net and the mortar for applying the material to the components of the building. This is achieved by composing the face layer of more than one single layer of granules, i.e. up to 2–3 layers.

The particle-size ranges of granules used in the cover layers can be relatively narrow, such as 1–2; 2–3; 3–4 mm, or else larger, such as 0.5–2; 1–4; 1.5–5 mm; the proportion of the various ranges can be fixed, according to the decorative effect pursued.

It is obvious that, for the same decorative purpose, the granules constituting the cover can be of the same kind, or else of various kinds, of the same color or of various colors, conveniently mixed beforehand and distributed in the same manner in constituting the cover, or else distributed unmixed, according to a predetermined geometry.

The practically invisible binder, which connects the granules to each other and to the supporting net, is designed so as to cover with fine pellicles the whole surface of the cover granules, and to connect them to each other as well as to the supporting net by means of fine films. The visible decorative face thus becomes a "conglomerate" of granules, practically invisibly bound, which has the appearance and the natural contours of the granules, and thus the natural stone appearance of the foil, in the case of granules from rock, or else a similar appearance, in the case of granules consisting of artificial materials.

Thermoplastic synthetic resins are employed as the binder, to which both the granules and the supporting net adhere.

As synthetic resins, corresponding to these conditions, vinylic polymers and copolymers are preferably used, such as polyvinyl acetates, acrylic polymers, such as methyl polymethacrylate, in the form of aqueous dispersions, or in solutions in one or more solvents, which are cheap, nonflammable and nontoxic.

These synthetic resins are employed unfilled and uncolored, or colored in the granule color, so that they supply transparent films, which remains invisible in the granule cover, even in deeper layers.

It has been further ascertained that the pellicles resulting from the binder and the above synthetic resins — used in the form of dispersions — are sufficiently water resistant. They swell slightly, but when dried, recover their initial resistance.

In order to avoid the alteration of the face layer, by water spraying and repeatedly drying afterwards, the layer is rendered water-repellant by spraying with a solution of the same polymer, or of another perfectly adhering to it. This operation may by performed during the manufacture of the material, or else after applying it to the building.

The supporting net which constitutes the bottom layer of the foil is necessary during the manufacturing process, as well as during the manipulation and the application of the foil. Thus, the meshes of the net must be of such dimensions, that their area should represent at least 70–80% of the total area, while their stable dimensions should not exceed about 70–80% of the lower dimensional limits of the hard granules employed.

Net-shaped supports made of natural textile materials may be employed, such as knits with constant-size meshes; for the sake of adhesion, and against a possible decay, these bibulous textile supports are impregnated with aqueous dispersions of the synthetic resin, or else with the synthetic resin solution employed as a binder. For the same purpose, the emulsion or the solution is filled with dust of a particle size below 0.5 mm of a material constituting the hard granules employed.

Supports of steel-wire screen may equally be employed, the wire being protected by zinc plating or by varnishing with plastics.

The support may be used in the shape of endless, or nearly endless, broad strips, a fact which constitutes an advantage, both in the manufacturing process, and in manipulation and applying.

Thus, a foil and decorative material according to the invention may have a length of, for instance, 5–20 m.

Due to its structure, the foil of material is sufficiently flexible to be wrapped around cores of 10–15 cm diameter, a fact which largely ensures the possibility to transport the rolls, to unfold them for the purpose of applying the foil in the shape of long strips on the components of the building, either in the manufacturing width or as a strip of smaller width cut out of the whole width.

It is of course possible to apply the material according to the invention in the form of plates of regular geometric shapes, square, etc., cut out of the foil and, namely, plates of the same or different structure and color, corresponding to the decorative needs.

The firm adhesion of the material in the shape of foils or plates to the components of the building is increased by the fact that the fastening mortar binds itself to the granule corners which penetrate through meshes of the support and to the net yarns; it penetrates through the free meshes of the net, fills the net voids of the granule cover, binds itself to the net granules and the binder pellicles without becoming visible on the foils decorative face.

Finally the material applied to the components of the building (walls, ceilings or especially floors) may be covered by a transparent layer, for smoothing out and for wear, consisting of a suitable synthetic resin. Such a layer may be applied by means of casting, using smoothing out doctoring processes, or by other processes.

The manufacturing process of the building-finishing and decorating material according to the invention is preferably, continuous, the supporting net being in horizontal motion and consisting of the following operations:

the priming of the supporting net if the latter is of natural textile fibers by drawing it through a bath of thermoplastic synthetic resin, a bath of an aqueous dispersion of the resin or a solution of the resin to which is added finely ground filler of the granules material, the excess of synthetic resin dispersion or solutions being removed by squeezing out the supporting net;

spreading a cover of previously washed and dried hard granules on the impregnated supporting net, the layer being of a uniform thickness according to the grain size; the cover is spread by free dosed flow of the granules, immediately followed by a slight pressing of the cover for the purpose of compressing the granules and of slightly smoothing the surface; the layer is 1-7 mm thick which represents 1.5-2.5 times the average size of the hard granules employed;

binding the granules to each other and to the supporting net by means of pellicles resulting from spraying the granule cover with an aqueous dispersion or a solution of the thermoplastic polymer employed; the liquid is sprayed from above under a convenient pressure, the operation being successively repeated, beginning from one edge of the strip towards the other; it was found convenient to employ dispersions with 20-30%, preferably 25%, of solid synthetic resin, or 12-23% of the resin, preferably 17%, in solution; with the above concentration the dispersion of the solution trickles down from the prominent portions of the granules, being retained in sufficient quantity in the body of the cover of granules and to the support, so as to ensure the covering of the whole surface of the granules and their solid binding by pellicles; the volume of dispersion or of solution sprayed is thus a volume which is in a small excess beyond that which is retained by the granules cover;

drying the sprayed binder by evaporating the water from the dispersion or the solvent of the solution by moderately heating the cover step by step and uniformly, followed by forming the binder into pellicles and then by the slight softening thereof; it was ascertained that these operations are favorably performed by infrared heating from below by means of infrared rays of the resulted foil of material to a final temperature of 80°-120° C. For this purpose, the foil of material must be supported and not drawn on a conveyor belt with large meshes, for instance, of wire net; the water vapor being evacuated and the solvent vapor recovered;

detaching the foil of material with the binder in the form of pellicles in a and softened state from the conveyor belt; the operation is advantageously performed by intercalating a roll of small diameter, over the conveyor belt, the roll rotating so as to contribute to the displacement of the foil of material;

pressing the warm foil with the binder softened for the purpose of this final compression and increasing the adhesion of the hard granules to each other and to the supporting net, as well as to calibrate the material thickness. This purpose can be easily achieved by drawing the material between two smooth rolls;

cooling the material to ambient temperature, removing the residual water or solvent vapor. This cooling process can be conveniently and actively performed on the back face of the material, by putting this face in contact with a planar and smooth water-cooled surface, along which the foil of material can be drawn; a cold air stream is blown along the upper decorative face of the material in a direction opposite to the displacement of the foil over the entire zone which is water cooled below;

coiling the cooled material on cardboard cores; cores of 10-15 cm in diameter may be employed, the length of the foil wrapped on it being 5-20 m.

The installation for continuously producing a material for finishing and decorating the buildings, according to the invention, and that applies the above described process, comprises the following:

means for priming by immersing the supporting net when it is made of natural textile fibers, with thermoplastic synthetic resin, dispersed in water and with fine filler from the material of the granules employed; the excess of priming bath being removed upon passing of the net over a roll; a first conveyor belt for supporting and horizontally displacing the primed net away from said priming means;

means for the spreading with slight pressing the granule cover, transversely, on the whole width, over the primed supporting net supported and displaced by the first conveyor belt;

means for spraying, repeatedly and in excess, from above, over the granule cover and the primed supporting net upon and displaced by the first conveyor, of the binder of transparent thermoplastic resin, dispersed in a liquid — either dispersed in water or dissolved in a solvent;

a heating tunnel downstream of the first conveyor belt, and a second conveyor belt of wire net with large meshes extending through this tunnel for conveying therethrough the supporting net bearing the cover of sprayed granules; the heating tunnel is also provided, below the second conveyor, with an array of infrared heaters, for the evaporation of the sprayed liquid — water or solvent —, the forming of its thermoplastic resin as fine pellicles, for binding the resulted material foil and slightly softening the fine pellicles thereof, by heating to a temperature of 80° to 120° C.;

a smooth roller rotated in the direction of displacement of the foil for detaching the material foil resulting in the tunnel, with the binder in the form of softened pellicles, from the second conveyor, at the discharge end of the tunnel;

a pair of pressing rolls, free and smooth, downstream the heating tunnel, for the final compacting of the resulted warm material foil, at its drawing through the rolls;

means downstream of the previous pressing rolls, for cooling the material foil, namely: from below, by displacing the foil over a water cooled metal surface, and from above, by an opposed cold air stream blown through a mouth by a ventilator; and means for coiling the cooled material foil on cardboard rolls or cores with transverse cutting to the established lengths.

The material for finishing and decorating the buildings, according to the invention — as manufactured by means of the process and the installation described above — looks like a split natural crystalline stone, consisting of granules of the same kind and color, or differing, bound by means of a practically invisible binder of organic polymer; its upper side has the appearance of a rugged surface, with prominent granules at different levels; the granules play the part of the stone crystals. Thus the material according to the invention keeps the natural appearance of the granules unchanged as well as their specific effect on light, possibly due to their different nature and to their situation at different planes. The material made with artificial granules — organic or inorganic — shows similar properties and new optical and decorative effects.

The material according to the invention has a resistance to wear and bad weather corresponding to that of the natural or artificial granules and of the binder employed. Applied to a building these materials may be impermeable to water, permeable to air and water vapor, of great durability and require little maintenance. These properties render the material fit for finishing and the inner and outer decoration of any kind of construction.

The material is adequately produced in the shape of a wide and long foil, possesses sufficient flexibility as to be manipulated in rolls. The foils may be of a large diversity according to the nature of the granules, their size, color and geometry of arrangement. When applying it, the foil, possibly cut into strips or plates, is applied with its back side to the components of the building such as walls, columns, ceilings, of plastered concrete, plastered brick masonry, wood, glass, gypsum, smooth faced stone.

SPECIFIC DESCRIPTION AND EXAMPLES

Figure 1:
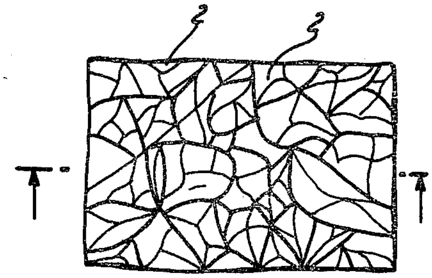
FIG. 1 is a frontal view of the material.
Figure 2:
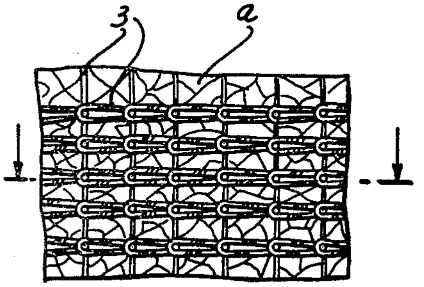
FIG. 2 is a back view of the material.
Figure 3:
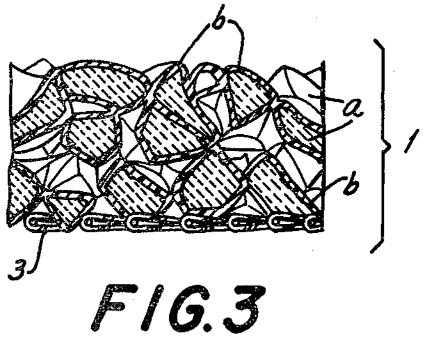
FIG. 3 is a cross-section through the material along the line A — A.

One embodiment of the invention according to FIGS. 1–3 shows the material consisting of:

face layer 1 composed of a cover of hard granules *a*, of white marble, broken, washed, dried and dimensionally sorted;

the binder 2, a thermoplastic synthetic resin, binding the granules of the layer by means of pellicles to each other and to the supporting net 3;

the pellicles of binder films *b* are visible in the drawing;

the supporting net 3 employed is a cotton thread knitting, with meshes of fixed dimensions;

the knitting has been impregnated;

when manufacturing the material, with an aqueous dispersion, for instance, of polyvinyl acetate (polymer of average viscosity, of 8,000–10,000 cP, and a value of K, equal to 70–75), fillerized with marble dust of less than 0.2 mm grain.

The cover of granules contains an average of about 2.5 layers of granules *a*, the range of sizes being narrow; part of the granules penetrate with their corners through the meshes of the supporting net 3.

Figure 4:
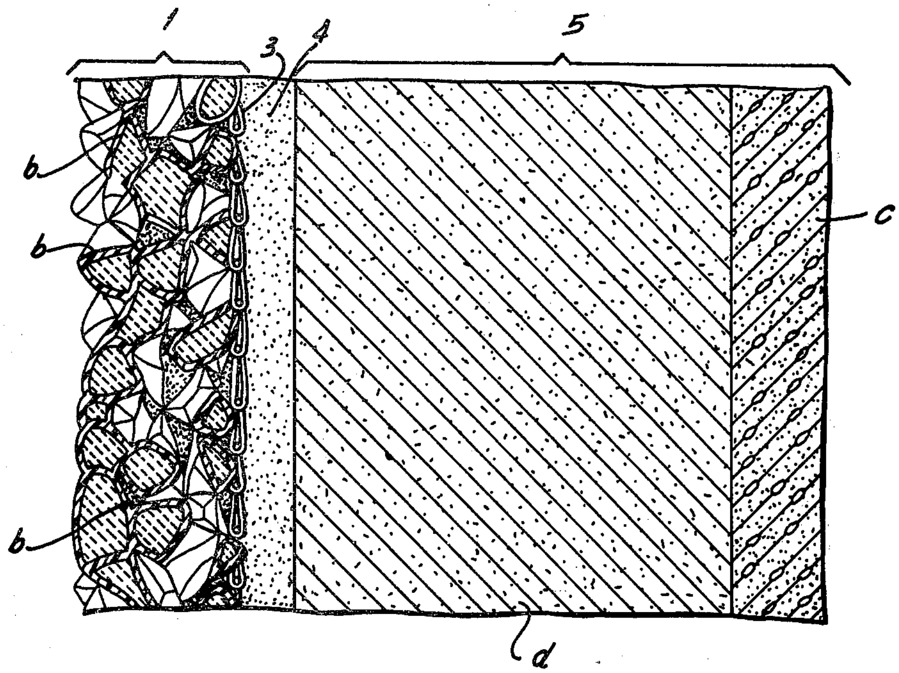
FIG. 4 is a section through the material applied by means of a layer of mortar to a component of the building.

The material has been applied, according to FIG. 4, by means of the adhesive mortar 4, to the building component 5, for instance, a reinforced concrete wall *c*, the layer of plastering being *d*, and the mortar of lime with cement.

The adhesive mortar 4 has been prepared according to the following recipe: cement of high initial strength, 1.5 parts; fine dry sand, of 0–0.2 mm grain size, 2 parts; lime paste 50%, the balance consisting in: water 0.10 parts; solid calcium chloride, 0.01 parts; mineral dye, in the hard granules color, in the present example, zinc white, 0.05 parts; polyvinyl acetate, in 50% water dispersion, 0.15 parts; water, up to 0.5 parts (all parts, expressed in weight figures). With this adhesive mortar, the material is firmly affixed to the building component.

The material is rendered water repellant after having been applied to the building component, by spraying polyvinyl chloride and acetate solved in cyclo-hexanone, over the face layer.

EXAMPLE 2

The installation for manufacturing the material for finishing and decoration of the buildings, object of this example, is a continuous working one, and may produce material with the cover of granules of the same kind or of different kinds, of the same color or of different colors, uniformly or non-uniformly mixed, before being spread, with the binder in acqueous dispersion or in solution, and the supporting net primed or non-primed.

Figure 5:
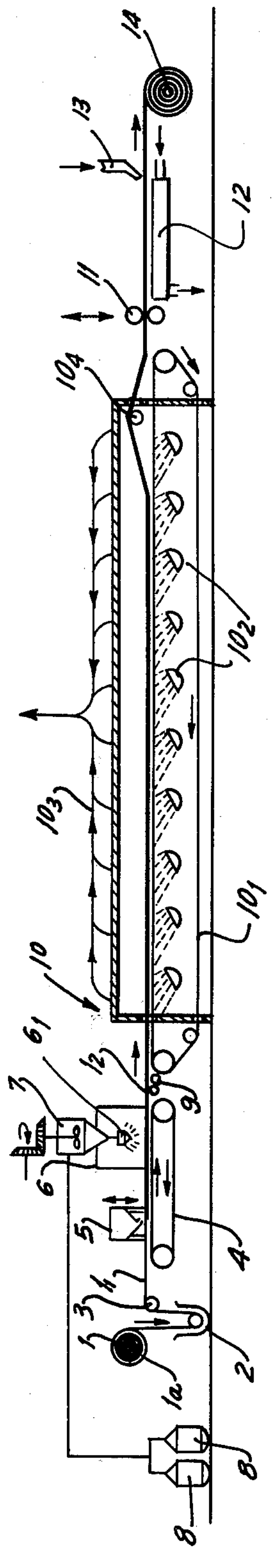
FIG. 5 is a schematic side view of an installation for making the material.
Figure 6:
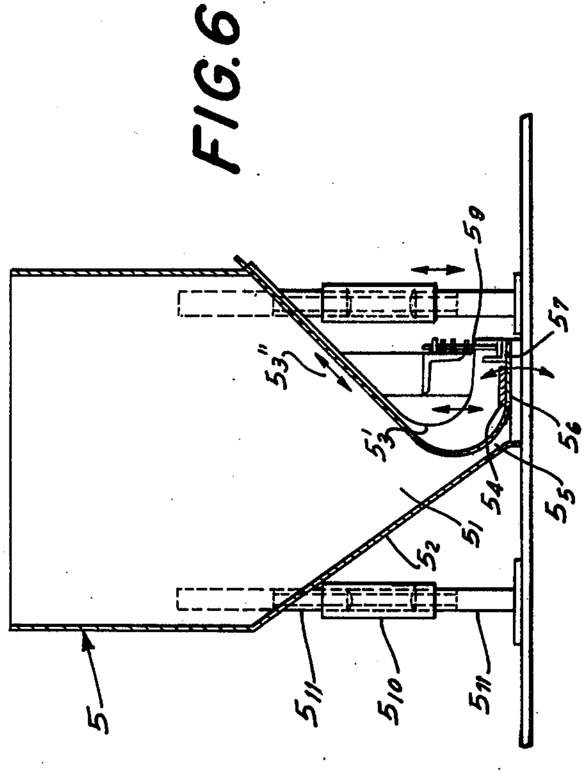
FIG. 6 is a cross-section through the spreading/dosing device of the installation.

In an adequate execution, the installation consists of the following parts, according to the schematic views in FIGS. 5 and 6, while its operation is described further down:

The unreeling device 1, bearing on its shafts the supporting net roll $\mathbf{1}_1$. The device unreels by traction and goes over the smooth roll in the baiting, or priming vat 2, which is filled with the baiting or priming liquid, maintained at a constant level (the liquid is an aqueous dispersion or solution of the polymer used, with powder of the hard granules material of the face layer, as a filler); when the supporting net requires no priming, it by-passes vat 2, going directly over the small diameter guiding and squeezing roll 3, of small diameter, provided with helical ribs arranged in opposite directions, from the center towards the ends; the directions of the ribs are such, that when roll 3 rotates, it extends the supporting net laterally, and if the latter is primed, squeezes out the primind liquid in excess, which is then led back to vat 2. The supporting net is then taken over by the conveyor belt 4, which drags it, at the same time exercising the tractive power, necessary for the unrolling, priming, guiding and squeezing operations, mentioned above. The conveyor belt is driven by a motor-reducer-variator set for the steples speed variation.

From the spreading-dosing device 5, continuously supplied over its whole length with hard granules, previously washed and dried, the granules are continuously distributed, transversely and simultaneously, over the whole width of the supporting net; the granules flow through the opening $\mathbf{5}_1$, which gets continuously narrower, between the fixed plain and sloping wall $\mathbf{5}_2$, and the cylindrically bent wall $\mathbf{5}_3$, which may glide (in the direction shown by arrow $\mathbf{5}_3''$) along the bent wall $\mathbf{5}_3'$; the lower end of the wall $\mathbf{5}_3$ is tangent to a plane, parallel to that of the conveyor belt 4, the free end of the wall $\mathbf{5}_3$ may be driven by means of a free-flap $\mathbf{5}_4$, of horizontal axis; the position of the flap $\mathbf{5}_4$ may be fixed; the position of the gliding wall $\mathbf{5}_3$ and of the flap $\mathbf{5}_4$ serve for the rough, respectively fine adjustment of slit $\mathbf{5}_5$, and consequently of the hard granules dosing; in continuation of the gliding wall $\mathbf{5}_3$, there is a horizontal scraper blade $\mathbf{5}_6$, sustained by the support $\mathbf{5}_7$, both being elastically maintained by means of the springs $\mathbf{5}_8$, which surround the bolts $\mathbf{5}_9$. The whole device is provided for its vertical displacement, by means of the double thread bushings $\mathbf{5}_{10}$, mounted on the legs $\mathbf{5}_{11}$ of the device. The scraper blade $\mathbf{5}_6$ levels the thickness of the "rough surface" granules cover spread over the supporting net $\mathbf{1}_1$.

The device 6 sprays over the granule cover and the supporting net $\mathbf{1}_1$, displaced by conveyor belt 4, an aqueous dispersion or a solution of thermoplastic synthetic resin, which flows by gravity from the tank 7 provided with a stirrer, which is located above, being supplied at regular intervals with fresh liquid, from one of the monte-jus 8, by means of compressed air. The liquid is aprayed downwards, atomized with or without compressed air, simultaneously, by the battery of nozzles $6_1$, uniformly distributed over a rectangular area, supplied individually with liquid from the tank 7, and still individually, with compressed air, over flexible hoses; the battery of nozzles has an adjustable spraying output and is borne by a trolley, running on rails in both directions, transversely with respect to the strip of foil; the motion is transmitted over chain wheels and chains, by means of a motor-reducer-variator set and an automatic reversing switch.

The supporting net $1_1$ with the granule cover, sprayed with liquid, goes over the rolls 9 in the drying tunnel 10, where it is conveyed by the conveyor belt $10_1$, made of large mesh wire net, drivan by a motor-reducer-continuous speed variator set, the speed being synchronized with that of conveyor belt 4. The supporting net with the granule cover, sprayed, are heated by means of gas-fired infrared heaters $10_2$, located below, whose fields of radiation cover the whole length and width of the strip of material within the tunnel, ensuring a step by step, moderate and uniform heating, to evaporate completely the liquid sprayed and to have the resulted material foil $1_2$, when leaving the tunnel, at a temperature of 80°-120° C. The binder used is thus transformed into pellicles and these slightly softened; the system of pipes $10_3$ evacuates the water vapor upwards to the atmosphere, or the solvent vapors to the condenser. The roll $10_4$ is located inside the tunnel, at the exit of the foil of material, immediately above the conveyor belt $10_1$, being smooth and of small diameter, and being rotated in the direction of displacement of the foil of material, at an adjustable tangential speed, equal to that of the conveyor belt $10_1$; the roll detaches the foil of material, with the binder in the shape of pellicles, softened, from the conveyor belt $10_1$, the foil going between the pair of free and smooth rolls 11, to be pressed, finally compacted and its thickness "gauged".

After having passed the rolls 11, the foil of material is cooled, gliding over the water cooling table 12, provided with flat box, with inner baffles and water circulation in counter-current with the foil of material, which is cooled down to the temperature of the surroundings. The foil of material is equally air cooled, over its whole upper surface, by means of the cold air blowing opening 13, blowing tangentially, at the final end of the water cooling table 12, supplied by an air blower, non shown.

The foil of material, cooled down to the surrounding temperature, is still flexible, so as to be wound on a cardboard roll of 10–15 cm dia, placed on the shaft of the rolling device 14, driven by a motor-reducer-continuous speed variator set, which equally drags the strip of material beyond the drying tunnel 10, between the rolls 11, and on the table 12, when the desired length of the roll is reached, the strip is cut manually, and the roll replaced, equally manually.

The whole installation may be automated, the conditions being those already known, and provided with a second, spare roll, as well as with mechanical means for cutting the strip of material, incorporated into the rolling device.

It is understandable that by adequate modification of the spreading-dosing device 5 and of its annexes, as for instance by its transversal division in compartments, by dividing the gliding, cylindrically bent wall regulating the flow, in several sections, corresponding to the compartments, and the control of the respective draining, the bunker being supplied with granules of different nature and color, finishing and decorative materials may be obtained with covers of granules, arranged according to preestablished geometries.

The application of the invention yields the following advantages:

it supplies a material for finishing and decorating the buildings, in the shape of a flexible, continuous strip, constituting a ready finished veneer, having the aspect of a split natural crystalline stone, or similar, with a wide range of assortments, colors, patterns, of high resistance and good adhesive properties, being a prefabricated material, applicable on outer and inner walls, on ceilings and even on floors, of low cost and application expenses, as compared to the ready finished veneers of plasterings, or other similar material of ceramics, glass, etc.;

the manufacturing process of the finishing and decorating material is simple, using granules of broken or natural rock, sometimes artificial granules, which are spread as a multi-layer cover, on a supporting net, bound together and the binder dried, the binder generating pellicles of practically invisible and reduced amounts of polymer;

the manufacturing installation of the finishing and decorating material is simple, not expensive, and of high productivity, being susceptible of complete mechanization and automation.

What we claim is:

1. An installation for continuously producing a material for the finishing and decorating of buildings, as a prefabricate flexible foil with the appearance of split natural crystalline stone, of the type in which a cover with several layers of granules is spread upon a supporting net and cover while bonding to each other and to the yarns of the supporting net by invisible fine pellicles of thermoplastic synthetic resin binder, said installation comprising:

means for priming the supporting net of natural textile fibers with thermoplastic synthetic resin dispersed in water and containing a fine filler of the granule material;

a first conveyor belt adjacent to said priming means for supporting and horizontally displacing the primed supporting net away from said priming means;

means for spreading and slightly pressing a granule cover of several layers of said granules, transversely over the whole width onto the primed supporting net supported and displaced by said first conveyor belt;

means for spraying, repeatedly and in excess, from above, over said granule cover and the primed supporting net, said binder of transparent, thermoplastic synthetic resin, dispersed in a liquid;

a heating tunnel, downstream of said first conveyor belt, and a second conveyor belt with large meshes extending through said tunnel for conveying therethrough the supporting net bearing said cover of sprayed granules, said tunnel being also provided, below said second conveyor belt, with an array of infrared heaters for the evaporation of said sprayed liquid thereby forming its thermoplastic resin into fine pellicles for bonding the resulting material foil and slightly softening the fine pellicles thereof, by heating to a temperature of 80° to 120° C.;

a smooth roller for detaching the resulting material foil with the binder in the form of softened fine pellicles from the said second conveyor belt at the discharge end of said tunnel;

a pair of pressing rolls downstream of said heating tunnel, for the final compacting of said resulting warm material foil upon its being drawn between the foils; and means downstream of said pressing rolls for cooling said material foil.

2. The installation defined in claim 1, wherein said means for spreading and slightly pressing said granule cover, over the supporting net, comprises a fine vertically displaceable hopper, having two downwardly converging sidewalls forming a discharge slit for the granules, said slit being inclined downwardly, in the displacing direction of said supporting net, on said first conveyor belt, said slit being defined by a substantially cylindrical portion downstream of said second sidewall and adjusted by the gliding of this wall, which ends with a substantially horizontal flap, swingable about a horizontal axis and the position of which may be fixed; the flap being continued downstream with a scraper-blade, elastically maintained by vertical springs, disposed above it.

3. The installation defined in claim 1, wherein said means for spraying, repeatedly and in excess, from above, comprises a battery of nozzles, carried by a trolley on rails, and means for the repeated displacing of said trolley, transversely, back and forth, across said supporting net with the spread granule cover.

* * * * *